United States Patent [19]
Albrecht et al.

[11] Patent Number: 5,837,780
[45] Date of Patent: Nov. 17, 1998

[54] POLY (METH) ACRYLAMIDES WITH IMPROVED COLOR STABILITY UNDER THERMAL STRESS

[75] Inventors: Klaus Albrecht, Mainz; Werner Hoess, Heusenstamm; Hartmut Schikowsky, Darmstadt, all of Germany

[73] Assignee: Roehm GmbH Chemische Fabrik, Darmstadt, Germany

[21] Appl. No.: 759,131

[22] Filed: Dec. 2, 1996

[30] Foreign Application Priority Data

Dec. 1, 1995 [DE] Germany ......... 195 44 562.7

[51] Int. Cl.$^6$ ........................................... C08F 8/32
[52] U.S. Cl. .................. 525/379; 525/330.5; 525/340
[58] Field of Search ............................ 525/340, 379

[56] References Cited

U.S. PATENT DOCUMENTS 5,280,073  1/1994  Siol et al. .
5,476,907  12/1995  Besecke et al. ............ 525/340

FOREIGN PATENT DOCUMENTS 0 576 877  1/1994  European Pat. Off. .
2 158 014  6/1972  Germany .
2 331 350  1/1974  Germany .

*Primary Examiner*—Bernard Lipman
*Attorney, Agent, or Firm*—Oblon, Spivak, McClelland, Maier & Neustadt, P.C.

[57] ABSTRACT

Molding compositions MC having a reduced tendency to yellow with thermal stress which consist of a polymer PM containing units of formula I:

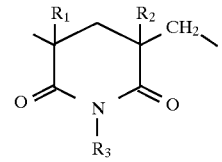

blending from 0.005–1 wt % of at least one reducing inorganic phosphorus compound IP selected from the group consisting of phosphinic and phosphonic acid and its alkali metal, alkaline-earth metal, a aluminum and ammonium salts, wherein the ammonium ion can be substituted with up to four $C_1$–$C_4$ alkyl and/or $C_5$-$C_8$ cycloalkyl groups, with the polymer PM after conclusion of the imidation reaction.

8 Claims, No Drawings

POLY (METH) ACRYLAMIDES WITH IMPROVED COLOR STABILITY UNDER THERMAL STRESS

BACKGROUND OF THE INVENTION

1. Field of the Invention

The invention relates to production, processing, and use of thermoplastics that are dimensionally stable under heat, and in particular, to molding compositions based on imidated polymethyl methacrylate. It describes molding compositions that, after processing to molding articles, for example, lamp shades, exhibit only a slight increase in yellowness.

2. Discussion of the Background

Polymers based on imidated polymethyl methacrylate are a unique class of highly transparent and thereby particularly dimensionally stable thermoplastics when subjected to heat. Molded articles made of this material can be exposed, in the long run, to temperatures clearly higher than molded articles made of other highly transparent thermoplastics such as polymethyl methacrylate (PMMA). Of course, the danger of discoloration also increases with the higher thermal stress. In order to be able to use these high-performance thermoplastics, for example, as shades for lamps, it is necessary to protect them, as much as possible, from thermally induced discoloration, which is visible as an increase in yellowness. Yellowness is measured in terms of the yellowness value according to DIN 6167 (D65/10) or according to ASTM D 1925.

RD 321,114 describes a method for reducing the yellowish tinge of polymethacrylimides, by carrying out imidation in an oxygen-free atmosphere. The removal of oxygen can be achieved only by an expensive distillation process, which is unfavorable economically.

European Patent No. A 576 877 describes a polymer based on polymethacrylimide and polyacrylimide with a low yellowness value, wherein salts of phosphine or phosphonic acid are added during the imidation reaction. The imidation reaction consists of reaction of a polymer based on $C_1$–$C_{20}$ alkyl esters of methacrylic acid and/or acrylic acid with ammonia or a primary-alkyl-substituted amine. It is carried out in a melt or in a solution under high pressure and at high temperature. According to European Patent No. A 576 877, the phosphorus compound is added to the reaction mixture and then exposed to these drastic conditions. The synthesis results in a molding composition that exhibits a relatively low yellow coloring. Upon consideration of this disclosure by the inventors, it was discovered that the molded articles produced from these molding compositions exhibit clear yellowing under thermal stress. Only at the beginning of molding is yellowing at a low level. As the thermal stress continues, however, the yellowness value steadily rises. The presence of the previously added reducing phosphorus compounds can hardly impart any stability against yellowing. It must, therefore, be assumed that under the imidation conditions, the phosphorus compound has been extensively consumed or it has been decomposed.

The quantities of phosphorus compounds employed in such compositions are accordingly high, apparently in order to compensate for a loss in effectiveness of the compounds. Quantities of 0.1–1 wt %, based on the quantity of polymers to be imidated, are preferably used. However, an increase in amounts of the phosphorus compound incorporated in the molding composition is not feasible, because other characteristics of the polymer are consequently impaired. According to what is known to the inventors, turbidity appears in the polymer with the addition of more than 0.1 wt % of the reducing phosphorus compound in the molding composition.

In experiments conducted by the inventors in accordance with European Patent No. A 576 877, it was found that phosphine was generated, in particular at high compound concentrations in the molding compositions. The generation of phosphine may, therefore, be used as an index of the decomposition of the reducing phosphorus compound in the method of the publication. Disproportionation of the hypophosphite additive should, therefore, be assumed to be one of the decomposition reactions which take place.

The use of reducing organic phosphorus compounds as antioxidants, which, among other things, are supposed to prevent the discoloration of plastic molding compositions with thermal stress, is known (see, for example, Kirk-Othmer, *Encyclopedia of Chemical Technology*, 3rd Ed., Vol. 3, p. 133, Wiley, N.Y., 1978). From case to case, they are also added to molding compositions before processing, that is, during the compounding step. Thus, in accordance with Japanese Application Kokai Tokkyo Koho JP 60 123 547, an improvement of the discoloration of copolymers of methyl methacrylate, styrene, and maleic anhydride monomer units, under injection molding conditions and at higher temperatures, is observed, if such copolymers are mixed with at least one phosphaphenanthrene derivative and also a sterically hindered phenol, a thiopropionic acid ester or a phosphorus acid ester as stabilizers against oxidative degradation, before processing by injection molding. Japanese Kokai Tokkyo Koho JP 60 120 735 describes copolymers of methyl methacrylate, vinyl aromatic substance, and polymerized-in cyclic anhydrides, to which phosphoric acid esters and other stabilizers based on sterically hindered phenols are added to increase thermal stability and to prevent the discoloration of such copolymers under thermal stress in the melt, for example, in injection molding.

Japanese Kokai Tokkyo Koho JP 03 167 245 claims the stabilization of copolymers of methyl methacrylate, N-substituted maleinimides and other copolymerizable monomers with compounds selected from the group of alkyl-substituted triaryl phosphates, the dialkyl pentaerythritol diphosphites, and the phosphaphenanthrene derivatives.

Japanese Kokai Tokkyo Koho JP 63 163 306 discloses copolymers of methyl methacrylate and $C_8$–$C_{20}$ alkyl methacrylate as the core material for optical light-conducting fibers, which contain, as stabilizers, phosphites, such as sterically hindered diaryl pentaerythritol diphosphites, or thiophosphites to prevent the discoloration of the copolymers under thermal stress.

In the four Japanese patents mentioned here, sterically hindered, organic phosphites are mentioned without exception, or organic phosphites, together with sterically hindered phenols. Inorganic reducing phosphorus compounds are not mentioned.

Also, German Utility Model No. 29,504,693.7 describes the use of sterically hindered organic phosphite compounds in molding compositions of copolymers, which consist of the monomer units of alkyl methacrylate, vinyl aromatic, and maleic anhydride, and optionally alkyl acrylate. The organic phosphorus compounds are added, from case to case, also to the finished, granulated, or comminuted polymer before further processing.

Organic phosphorus compounds, namely sterically hindered organophosphites or organophosphonites, are also used, according to European Patent No. A 396 336, to prevent discoloration of polymers based on (N-alkyl)

dialkylglutarimide and (N-hydrogen)dialkylglutarimide and to stabilize the polymers against bubble formation. European Patent No. A 463 754 discloses the use of trialkyl phosphites and aliphatic dicyclodiphosphites for the same purpose.

In the last three patent applications mentioned above, only organic reducing sterically hindered phosphorus compounds are also mentioned, but not inorganic reducing phosphorus compounds. A need, therefore, continues to exist for imidated polymethyl methacrylate molding compositions which exhibit improved stability against yellowing.

The known art techniques do not permit one of skill to expect the successful preparation of any molding composition, based on imidated polymethyl methacrylate, which is suitable for the production of highly transparent, yellow free molded articles, which is dimensionally stable with heat and which also exhibits a reduced yellowness value increase even when subjected to continuous thermal stress.

SUMMARY OF THE INVENTION

Accordingly, one object of the present invention is to provide an imidated polymethyl methacrylate based molding composition which enables the production of transparent, yellow free molded articles, which are dimensionally stable to heat and which exhibit a reduced tendency to increase in yellow coloration when subjected to thermal stress.

Briefly, this object and other objects of the present invention as hereinafter will become more readily apparent can be attained by a method for providing molding compositions MC which have a reduced tendency to yellow when subjected to thermal stress, which consists of a polymer PM containing units of formula (I):

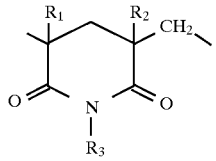

wherein $R_1$ and $R_2$ are hydrogen and methyl, and $R_3$ denotes hydrogen, $C_1$–$C_{18}$ alkyl, $C_5$–$C_8$ cycloalkyl, $C_6$–$C_{10}$ aryl, $C_6$–$C_{10}$ aryl-$C_1C_4$ alkyl, wherein these groups can be substituted up to three-times with groups selected from the group consisting of $C_1$–$C_4$-alkyl, $C_1$–$C_4$ alkoxy and halogen, comprising:

imidizing a (meth)acrylate ester with a primary amine in a reaction extruder, thereby preparing the polymer PM; and blending from 0.005–1 wt. % of at least one reducing inorganic phosphorus compound IP selected from the group consisting of phosphinic and phosphonic acid and its alkali metal, alkaline earth metal and aluminum derivatives, as well as ammonium salts, wherein the ammonium ion can be substituted with up to four $C_{1-C4}$ alkyl and/or $C_5$–$C_8$ cycloalkyl groups, with the polymer PM after conclusion of the imidation reaction.

DETAILED DESCRIPTION OF THE PREFERRED EMBODIMENTS

Polymer PM

The polymer starting material for the method of the present invention is a finished polymer PM having a poly (meth)acrylimide structure. The method for its production of the polymers is not critical and, in fact, can be any known technique. Such methods are a presupposed part of the invention. Starting polymers can be prepared by the methods described, for example, in German Patent No. A 4,002,904, European Patent No. A 234 726, U.S. Pat. Nos. 4,246,374, 3,246,374, European Patent Nos. A 463 754, A 396 336, and A 576 877.

At least 5 wt %, preferably at least 30 wt %, most preferably at least 60 wt % of the structure of formula I is present in the polymer, wherein the imide group is preferably substituted with methyl ($R_3$ =methyl). Also, $R_1$ and $R_2$ in formula I are preferably methyl groups. The particularly preferred polymer accordingly contains (N-methyl) dimethylglutarimide units. In accordance with production, not only glutarimide units, but also small quantities of acid and anhydride units, and remaining (meth)acrylic ester units can be present in the polymer. If the imidation is conducted on a polymer containing styrene, α-methylstyrene, methacrylonitrile, vinyl acetate, or other ethylenically unsaturated comonomer, such as ethylene or butadiene, then these units remain unaffected by the reaction and form a component of the polymer composition used as starting material PM, The preferred polymers based on poly-N-methylmethacrylimide are thermoplastics that are particularly dimensionally stable with heat. Their Vicat values reside at 120° C. to over 200°, depending on the degree of methylation of the imide group. The lower Vicat values are attained with low degrees of imidation around 5%, while the higher Vicat values are attained with high degrees of imidation, wherein only a part of the substituents on the imide group are methyl radicals.

The reducing phosphorus compounds IP contain phosphorus of the oxidation state +1 or +3. Technically readily accessible are salts of phosphinic acid (hypophosphites) and phosphonic acid (secondary phosphates), and the free acids themselves. It does not matter if the salts or the free acids are present in the ortho or the meta form or also, for example, as diners. Alkali metal, alkaline-earth metal, aluminum and ammonium salts can be used, wherein the ammonium ion can be substituted with up to four $C_1$–$C_4$ alkyl and/or $C_5$–$C_8$ cycloalkyl groups.

Organic reducing phosphorus compounds selected from the group of aliphatic or monoaliphatic esters, are far less effective. This is true, above all, for the various antioxidants known to the art, based on organic phosphates. Sodium hypophosphate can be obtained in a particularly effective and also low-cost manner. Its use is a preferred specific embodiment of the invention. Although, according to the literature, it thermally decomposes easily, with disproportionation, it has proved good for the purposes of the invention.

Alkaline-earth metal hypophosphites such as calcium hypophosphite, are more stable. The use of this salt is also a preferred specific embodiment. Salt mixtures can also be used.

What unexpectedly distinguishes the present invention from the state of the art, regarding the use of reducing inorganic phosphorus compounds, is that in the present invention, the lowest concentrations of these compounds is sufficient for the purposes of the invention. Thus, with 0.005 wt %, based on the polymer, recognizable effects are attained. The maximum effect can be attained with 0.02–0.05 wt % of reducing inorganic phosphorus compounds. For the most part, it is not advisable to select a concentration higher than 0.1 wt %. There is no advantage to be gained by adding more than 1 wt % reducing inorganic phosphorous compound IP, since at these concentration levels the characteristics of the composition are greatly impaired such as turbidity of the polymer or worsened resistance to weathering. Accordingly, concentrations of reducing inorganic phosphorus compound of at least 0.005 and less than 0.1 wt %, based on polymer PM, are preferred.

The inorganic reducing phosphorus compound IP of the invention is as a rule, applied in solution. Water is usually best suited as a solvent. The reducing phosphorus compound is advantageously used in the most concentrated solution possible. A particularly suitable concentration is 50 wt %, usually at room temperature. Depending on the dissolution and application temperatures, other concentrations are also possible or necessary, for example, 30–65 wt %. It is surprising that even at low volumes of reducing agent, as is encountered with concentrated solutions of the phosphorus compound, one can obtain homogeneous distribution of the inorganic reducing compound over the entire polymer charge. However, it is also possible to apply the reducing inorganic phosphorus compound in powder form, that is, without use of solvent.

Even if it is possible in principle to add the components of a mixture of reducing phosphorus compound to the polymer, one after the other, a mixture or solution of the component is first produced, as a rule, and it is added to the polymer in one step. A monocomponent stabilizer is more advantageous for homogeneous distribution.

Because of the significant yellow tinge retarding effect achieved by the present invention, the addition of blue dye to the molding composition, which has been used to neutralize the yellow coloring which occurs upon subjecting molded articles to thermal stress, can be omitted.

The incorporation of the reducing inorganic phosphorus compound IP takes place in the invention, at a late point in time of processing. In this way, a premature decomposition of the decolorizing agent can be avoided. Above all, the reducing inorganic phosphorus compound is not exposed, as in the art, to high thermal stresses of the imidation reaction. Under no circumstances is the addition carried out in the reaction extruder, in any case, after the reaction zone The late point in time and the mode of incorporation are decisively important features of the invention.

In one embodiment of the invention the reducing inorganic phosphorus compound is incorporated into the composition immediately after conclusion of the imidation reaction, in the degassing extruder downstream from the reaction extruder. The metering site is selected in such a way that the addition takes place in the already degassed melt. The advantage of this method of addition is that an additional processing step is not necessary and it follows the reaction seamlessly.

In another embodiment the reducing inorganic phosphorus compound is added to the finished polymer during compounding. In order to carry out this method embodiment of the invention, the polymer should be present in particle form. Granules and also comminuted material in the most varied degrees of comminution, for example, are especially suitable. Preferably an average particle size of 1–5 mm is selected. The mixing of the reducing inorganic phosphorus compound with the polymer PM present in particle form usually takes place initially in low-speed mixing units, such as a drum, gyrowheel, or double-chamber plowshare mixers. The low-speed units bring about mixing without eliminating the phase boundaries (see Ullmans Enzyklopädie der technischen Chemie [Ullmann's Encyclopedia of Technical Chemistry), 4th Edition, Vol. 2, pp. 282–311, Verlag Chemie, Weinheim, N.Y., 1980). This mixture is prepared as a thermoplastic in the following processing step of melting. For this step, heatable mixing units are used at suitable temperatures, as a rule, between 250° –350° C. Suitable heatable mixing units are single-screw or multiscrew extruders or extruders with an oscillating screw, and optionally also with shear pins. Molding compositions MC in particle sizes of, for example, 1–5 mm can be produced with this method.

Another embodiment of addition is to melt, once again, in a separate extruder, imidated poly(meth)acrylate, already present in granulated or comminuted form, and to add the reducing inorganic phosphorus compound IP to the melt. It can be pumped in, for example, as a solution. After cooling and cutting, one obtains the molding composition MC of the invention. Advantageously, this embodiment can be combined with a shaping process that immediately follows.

The molding compositions MC of the invention are processed to molded articles MA. To this end, common methods known in the art, such as injection molding, extruding, pressing, sintering, and also other shaping methods, are suitable. The shaping of molded articles is not limited. In accordance with their high dimensional stability with heat, the focus of the application is, of course, on molded articles that are exposed to high temperatures, such as lamp shades or lenses in illumination technology, and on molded articles in the temperature-stressed areas of motor vehicles, such as headlight-diffusing screens, back lights or fog headlamps, among others.

The method of incorporating the reducing inorganic phosphorus compound into a composition is, as a rule, a single simple step, because the stabilization agent is added as a component. It is an advantage that it is not necessary to intervene in the method of production itself, since the polymer is available on the market and is produced on an industrial scale. With regard to the quantity and the chemical nature of the reducing inorganic phosphorus compound IP, the method is very low cost since only a small amount of stabilizer is used. The method is of particularly low cost when sodium hypophosphite is used.

The technical advantages of the invention are important. Thus, a molded article produced by the method of the invention is practically colorless. Its yellowness value or Yi yellowness index, measured according to DIN 6167 (D65/10) or according to ASTM D 1925, is below 2, preferably below 1. Frequently, even values below 0.5 are obtained. Specimens not subjected to the treatment of the invention, that is, Which have been compounded without the addition of reducing inorganic phosphorus compounds, as a rule, have yellowness values above 3.

Instead of the yellowness value, the transmission of an injection-molded disk with dimensions of 60×45×3 mm can also be used to characterize the optical properties. The transmission of a disk produced by the present method lies close to the theoretical value of 92% transmission, namely, 86×92%, depending on the degree of imidation.

The decisive advantage of the method of the invention is, however, the excellent-color stability of the molded article prepared when subjected to continuous thermal stress. An increase in the yellowness value cannot be entirely avoided, but it is clearly less than those compositions which are within the state of the art. The color stability of a molded article MA is tested by thermal stress of a test disk in a circulating-air drying cabinet at 160° C. for up to 1000 h of storage time. At certain time intervals, the yellowness value is tested, and a curve of the yellowness value increase can be plotted. Molded articles of the invention exhibit a yellowness value increase on the average of only <0.02 per hour. Even yellowness value increases of less than 0.01 per hour are possible. In experiments which have been conducted, (see examples) yellowness values of <15, in most cases <10, can be attained with a thermal stress of 160° C. for over 800 h.

The molding compositions MC of the invention are also used in the production of optically demanding molded articles. It is precisely with particularly long flow paths and/or complicated molded article configurations that high processing temperatures are necessary. Here the reducing inorganic phosphorus compounds IP of the invention stabilize with respect to yellowing of the molded article during its production.

Having generally described this invention, a further understanding can be obtained by reference to certain specific examples which are provided herein for purposes of illustration only and are not intended to be limiting unless otherwise specified.

Example 1

This example is a comparative example within the state of the art, wherein addition of hypophosphite addition to the reaction mixture occurs during imidation.

The polymer-analogous reaction,-namely imidation, was carried out in a reaction extrusion unit consisting of a reaction extruder with a highly effective mixing part and a degassing extruder having two degassing zones. A 10 kg amount of a PMMA molding mass was introduced into the reaction extruder per hour. Two supply sites for liquids are located in the first part of the mixing path. A quantity of 200 ml of a 50% aqueous solution of sodium hypophosphite per hour was injected under pressure into the first supply site. A 3000 g amount of methylamine per hour was supplied as a reaction agent via the second supply site. The average reaction time was 5 min at a temperature of 2500C. After conclusion of the reaction, the reaction mixture in the degassing extruder was depressurized, the gaseous and volatile fractions were removed, and finally strands that were cooled and cut into granules were extruded.

Note that the reducing inorganic phosphorus compound was added, in accordance with European Patent No. A 576 877, to the reaction mixture during the imidation reaction.

A number of specimens, 65×40×3 mm, were injection-molded from the product obtained in an injection molding machine Battenfeld RA 300/100, and their yellowness value was determined according to DIN 6167. The measured yellow value amounted to 1.4. The Vicat softening temperature, determined according to ISO 306, Method B 50, was 172.4° C.

Four pieces from the injection-molded specimens were placed in a circulating-air heating cabinet and stored at 160° C. for 1000 h. After 500 h, 800 h, and 1000 h specimens were removed, cooled, and the yellowness values were measured. The following results were obtained.

TABLE I

Yellowness values of imidated polymethyl methacrylate with warm storage as a function of storage time*

| Storage time at 160° C. (h) | 0 | 500 | 800 | 1000 |
|---|---|---|---|---|
| Yellowness value [-] | 1.4 | 12.6 | 32.6 | |

A strong increase in the yellowness value with warm storage can be easily recognized for the specimens obtained which are within the state of the art.

Example 2 (invention)

The imidation reaction was carried out, under identical conditions, in the imidation unit described in Example 1. No sodium hypophosphite solution was injected into the reaction extruder. After the removal of the gaseous reaction components, strands of the polymer were drawn, cooled and cut into granules. A 15 kg amount of the obtained granules were poured into a stainless steel vat of 30 L, and a quantity of 150 g sodium hypophosphite, as a 50% aqueous solution, was weighed. Accordingly, the addition of the sodium hypophosphite was carried out here, in accordance with the invention, just before the compounding. A drum mixer was used to mix the components intimately for 4 min and introduced into the funnel of a 25-mm (=d) single-screw extruder. The mixture was compounded on a single-screw extruder that is 32×d long, and then in accordance with Example 1, specimens were injection molded. Their yellowness value measured was 0.8.

In accordance with Example 1, four specimens of the product stabilized according to the invention were subjected to a temperature stress at 160° C. for over 1000 h. The following results were obtained.

TABLE II

Yellowness values of imidated polymethyl methacrylate

| Storage time at 160° (h) | 0 | 500 | 800 | 1000 |
|---|---|---|---|---|
| Yellowness value [-] | 0.8 | 3.9 | 8.0 | 10.2 |

An only slight increase in yellowness value with warm storage is observed when the method of the invention is conducted.

Example 3 (invention)

The local addition of sodium hypophosphite solution to the reaction unit for the production of imidated polymethyl methacrylate described in Example 1 was changed so that the aqueous sodium hypophosphite solation was not added in the area of the reactor but rather in the downstream degassing extruder. The metering site was selected in such a way that the addition was carried out to the volatile melt freed from components which can be degassed. One specimen was produced from the granules obtained in Example 1, and was thermally stressed for a time period of 1000 h at 160° C.

Using the temperature stress of Example 1, the product stabilized by the invention exhibited the following yellow coloring.

TABLE III

Yellowness value of imidated polymethyl methacrylate

| Storage time at 160° C. | 0 | 500 | 800 | 1000 |
|---|---|---|---|---|
| Yellowness value [-] | 0.3 | 3.2 | 7.1 | 9.2 |

Only a slight increase in the yellowness value with warm storage of the specimen is clearly recognizable. Here too, the sodium hypophosphite had been added only after the conclusion of the imidation reaction.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A method for the production of molding compositions MC having a reduced tendency to yellow with thermal stress, said molding composition consisting of a polymer PM containing units of formula I:

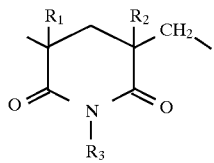

wherein $R_1$ and $R_2$ are hydrogen and methyl, and $R_3$ denotes hydrogen, $C_1$–$C_{18}$ alkyl, $C_5$–$C_8$ cycloalkyl, $C_6$–$C_{10}$ aryl, $C_6$–$C_{10}$ aryl-$C_1$–$C_4$ alkyl, wherein these groups can be substituted up to three times with groups selected from the group consisting of $C_1$–$C_4$ alkyl, $C_1$–$C_4$ alkoxy and halogen, comprising:
  imidizing a (meth)acrylate ester with a primary amine in a reaction extruder thereby preparing the polymer PM; and
  blending from 0.005–1 wt % of at least one reducing inorganic phosphorus compound IP, selected from the group consisting of phosphinic and phosphonic acid and its alkali metal, alkaline-earth metal, aluminum and ammonium salts, wherein the ammonium ion can be substituted with up to four $C_1$–$C_4$ alkyl and/or $C_5$–$C_8$ cycloalkyl groups, with the polymer PM after conclusion of the imidation reaction.

2. The method according to claim 1, wherein from 0.005 to 0.1 wt % of the reducing inorganic phosphorus compound IP, based on the weight of polymer PM, is blended with the polymer PM.

3. The method according to claim 1, wherein the reducing inorganic phosphorus compound IP is sodium hypophosphite.

4. The method according to claim 1, wherein the reducing inorganic phosphorus compound IP is calcium hypophosphite.

5. The method according to claim 1, wherein the reducing inorganic phosphorus compound is added to polymer PM as an aqueous solution.

6. The method according to claim 1, wherein the reducing inorganic phosphorus compound IP is mixed with particulate polymer PM.

7. The method according to claim 1, wherein the reducing inorganic phosphorus compound IP is mixed into a melt of polymer PM freed from volatile components.

8. The method according to claim 7, wherein the admixture of the reducing inorganic phosphorous compound IP is carried out continuously in a degassing extruder downstream from the reaction extruder.

* * * * *

UNITED STATES PATENT AND TRADEMARK OFFICE
CERTIFICATE OF CORRECTION

PATENT NO. : 5,837,780
DATED : November 17, 1998
INVENTOR(S) : Klaus ALBRECHT et al.

It is certified that error appears in the above-identified patent and that said Letters Patent is hereby corrected as shown below:

On the title page, item [30], the Foreign Application Priority Data should read:

--Nov. 30, 1995 [DE] Germany ......................195 44 562.7--

Signed and Sealed this

Twenty-second Day of June, 1999

Attest:

Q. TODD DICKINSON

*Attesting Officer*     *Acting Commissioner of Patents and Trademarks*

UNITED STATES PATENT AND TRADEMARK OFFICE
CERTIFICATE OF CORRECTION

PATENT NO. : 5,837,780
DATED : November 17, 1998
INVENTOR(S) : Klaus Albrecht, et al.

Page 1 of 1

It is certified that error appears in the above-identified patent and that said Letters Patent is hereby corrected as shown below:

Paragraph [54] on the title page and in in the title of column 1, "ACRYLAMIDES" should read --ACRYLIMIDES--;

Column 1,
Line 11, "molding" should read --molded--;
Line 12, "lamp shades" should read --lenses--;

Column 7,
Line 33, "2500C" should read --250°C--;

Column 9,
Line 16, "imidizing a (meth)acrylate" should read --imidating a poly(meth) acrylate--.

Signed and Sealed this

Seventeenth Day of July, 2001

*Attest:*

Nicholas P. Godici

NICHOLAS P. GODICI
*Acting Director of the United States Patent and Trademark Office*

*Attesting Officer*